United States Patent
Dorninger et al.

(10) Patent No.: US 9,627,116 B2
(45) Date of Patent: Apr. 18, 2017

(54) METHOD FOR PRODUCING A NON-GRAIN-ORIENTED HIGHER-STRENGTH ELECTRICAL STRIP AND USE THEREOF

(71) Applicant: voestalpine Stahl GmbH, Linz (AT)

(72) Inventors: Franz Dorninger, Katsdorf (AT); Roman Sonnleitner, Bad Hall (AT); Herbert Kreuzer, Linz (AT)

(73) Assignee: voestalpine Stahl GmbH, Linz (AT)

( * ) Notice: Subject to any disclaimer, the term of this patent is extended or adjusted under 35 U.S.C. 154(b) by 207 days.

(21) Appl. No.: 14/345,012

(22) PCT Filed: Sep. 17, 2012

(86) PCT No.: PCT/EP2012/068245
§ 371 (c)(1),
(2) Date: Mar. 18, 2014

(87) PCT Pub. No.: WO2013/038008
PCT Pub. Date: Mar. 21, 2013

(65) Prior Publication Data
US 2014/0366988 A1 Dec. 18, 2014

(30) Foreign Application Priority Data
Sep. 16, 2011 (DE) .................. 10 2011 053 722

(51) Int. Cl.
*H01B 5/02* (2006.01)
*C21D 8/12* (2006.01)
(Continued)

(52) U.S. Cl.
CPC ......... *H01F 1/14791* (2013.01); *C21D 6/008* (2013.01); *C21D 8/1222* (2013.01);
(Continued)

(58) Field of Classification Search
CPC ........ H01F 1/14791; H01B 5/02; H02K 1/12; H02K 1/22; C22C 38/06; C21D 8/1261
See application file for complete search history.

(56) References Cited

U.S. PATENT DOCUMENTS

2009/0202383 A1   8/2009  Tanaka et al.

FOREIGN PATENT DOCUMENTS

| | | |
|---|---|---|
| EP | 2031079 A1 | 3/2009 |
| JP | 2001-049402 | 2/2001 |
| JP | 2010-90474 | 4/2010 |

OTHER PUBLICATIONS

"Magnetic and Mechanical Properties of Newly Developed High-Strength Non-Oriented Electrical Steel," Ichiro Tanaka and Hiroyoshi Yashiki, 4th International Conference on Magnetism and Metallurgy—Proceedings, Freiburg—Germany, Jun. 9-11, 2010, pp. 277-281.

(Continued)

*Primary Examiner* — Veronica F Faison

(57) ABSTRACT

A method for producing a higher-strength, non-grain-oriented electrical strip, according to which a slab is cast from a molten mass, the slab is hot-rolled and then cold-rolled—optionally a hot-strip annealing can be carried out between the hot-rolling and the cold-rolling—and the cold strip is annealed in order to produce a partially recrystallized structure so that the mechanical strength values ReH can be set within the range of 450 MPa to 850 MPa at an annealing temperature of between 600° C. and 800° C. for 60 s to 300 s.

10 Claims, 4 Drawing Sheets

(51) Int. Cl.

| | |
|---|---|
| *H01F 1/147* | (2006.01) |
| *C21D 6/00* | (2006.01) |
| *C21D 9/46* | (2006.01) |
| *C22C 38/00* | (2006.01) |
| *C22C 38/02* | (2006.01) |
| *H02K 1/02* | (2006.01) |
| *C22C 38/04* | (2006.01) |
| *C22C 38/06* | (2006.01) |
| *H01F 1/153* | (2006.01) |
| *H02K 1/12* | (2006.01) |
| *H02K 1/22* | (2006.01) |

(52) U.S. Cl.
CPC ......... *C21D 8/1233* (2013.01); *C21D 8/1261* (2013.01); *C21D 8/1272* (2013.01); *C21D 9/46* (2013.01); *C22C 38/004* (2013.01); *C22C 38/02* (2013.01); *C22C 38/04* (2013.01); *C22C 38/06* (2013.01); *H01B 5/02* (2013.01); *H01F 1/15308* (2013.01); *H02K 1/02* (2013.01); *H02K 1/12* (2013.01); *H02K 1/22* (2013.01); *C21D 2201/05* (2013.01)

(56) References Cited

OTHER PUBLICATIONS

"Metallic Materials—Conversion of Hardness Values," DIN EN ISO 18265: 2003, Feb. 2004 (German version pp. 1-76, English version pp. 1-73).
"Metallic Materials—Vickers Hardness Test—Part 1: Test Method," DIN EN ISO 6507-1: 2005, Mar. 2005, pp. 1-23.

METHOD FOR PRODUCING A NON-GRAIN-ORIENTED HIGHER-STRENGTH ELECTRICAL STRIP AND USE THEREOF

FIELD OF THE INVENTION

The invention relates to a method for producing a higher-strength electrical strip and also relates to the electrical strip produced with the method and the use thereof.

BACKGROUND OF THE INVENTION

Stator and rotor stacks in electric motors and generators as well as lamination stacks of transformers are produced from so-called electrical strip. Electrical strip is a strip steel sheet, for example with thicknesses of between 0.1 mm and 2 mm.

This strip steel sheet is stamped into the required shapes and the individually stamped components are assembled into corresponding stacks, which are then processed to produce finished electric motors, generators, or transformers. In these stamping processes, in order to reduce waste, usually both the rotor parts and the stator parts are stamped out of the same sheet and therefore have correspondingly similar properties. If an iron core (stacked sheets) of this kind is used in a coil, then its ferromagnetic properties—which are preset or at the least prepared by the steel manufacturer so that they are set by the user through a finish annealing—increase the permeability and therefore also the magnetic flux density in the coil. As a result, it is possible to reduce the number of windings needed to achieve a required inductance.

Because the iron of the core is an electrical conductor, in a coil with an iron core through which alternating current is flowing, a current flows in a quasi-short-circuit is winding, which is referred to as eddy current. This eddy current is reduced if the core is not made out of a single piece of iron, but rather out of a stack of the above-described iron sheets.

Electrical strips of this kind are composed of a relatively soft steel material. Particularly in the production of motors and generators, it is of interest for the manufacturer to reduce the air gaps because this increases the magnetic effectiveness; on the other hand, particularly with very high speed motors and in particular generators, very powerful centrifugal forces occur. Particularly in generators, the rotors can be relatively large so that the moving masses can produce very powerful centrifugal forces. These very powerful centrifugal forces on the one hand result in the fact that a stretching occurs so that very narrow air gaps are difficult to implement and on the other hand, the powerful centrifugal forces can also result in a failure of the rotor material.

In order to counteract these problems, it is known from the prior art to provide electrical strip with higher strength properties.

In order to increase the strength properties of electrical strip, it is customary to work with aluminum/silicon alloy concepts. Such alloy concepts are known, for example, from JP 2010090474 A, in which a relatively high silicon content is used. A general overview is provided by a paper from the "4th International Conference on Magnetism and Metallurgy," WMM '10, Freiburg, Germany, "Magnetic and Mechanical Properties of Newly Developed High-Strength Non-Oriented Electrical Steel," pages 277 through 281.

In addition, EP 2031 079 A1 has disclosed a high-strength electromagnetic steel strip and a method for the production thereof. This document has disclosed that copper increases the degree of recrystallization; the content should be less than 0.1 mass %, in particular less than 0.01 mass %.

The object of the invention is to create a method for producing a higher-strength non-grain-oriented electrical strip, which strip, in addition to a high strength, has good magnetic properties.

SUMMARY OF THE INVENTION

According to the invention, a partially recrystallized structure is used to adjust definite strength values by making use of segregation regions in the structure.

Wherever contents are given below, these are understood to always be in mass %.

In the production of high-alloy electrical strip with silicon contents >2 mass %, segregations of silicon occur in the slab during continuous casting. After the heating and subsequent hot-rolling process, elongated regions with elevated silicon contents are visible in the cross-section of the hot strip (FIG. 1). These are also visible in the cold-rolled state (FIGS. 2 and 3). In these regions, the elevated silicon content delays the recrystallization somewhat in comparison to regions with a lower silicon content. Together with other mechanisms, e.g. the shear deformation in the regions close to the surface and a smaller hot strip grain size in the regions close to the surface, with a corresponding selection of a time/temperature window, results in a recrystallization during finishing annealing primarily in the silicon-poorer regions close to the surface, whereas segregation regions with an elevated silicon content only occur in a relaxed and non-recrystallized state (FIGS. 2 and 3).

To this extent, different mechanical properties are produced over the thickness of the strip, with the mechanical properties of the overall structure being influenced as a function of the recrystallization percentage or recrystallization gradient.

The above-mentioned relaxed regions contribute to the high strength of the material and the recrystallized regions contribute to its good magnetic properties, so that in this case, a compromise can be struck between the magnetic properties and the high strengths.

In addition, a strength-increasing action is achieved through the addition of solid solution hardening elements such as Si (required for segregation regions), Al, Mn, and P.

BRIEF DESCRIPTION OF THE DRAWINGS

The invention will be explained by way of example below in conjunction with the drawings. In the drawings.

DETAILED DESCRIPTION OF THE PREFERRED EMBODIMENTS

Figure 1:
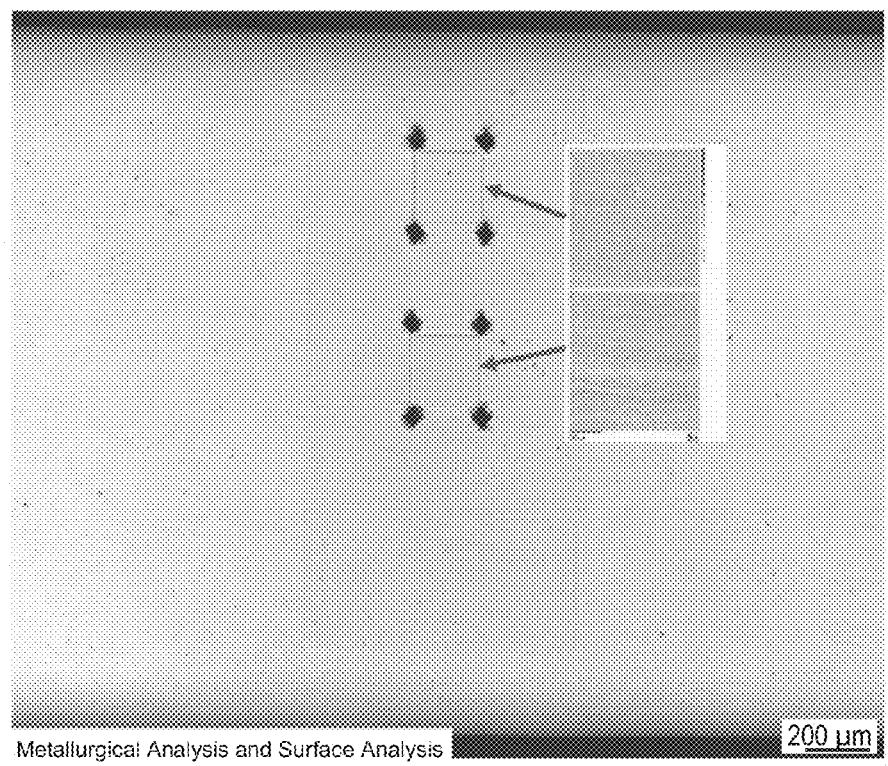
FIG. 1: shows an element distribution analysis by means of a micro-probe over the cross-section of a hot strip specimen.
Figure 2:
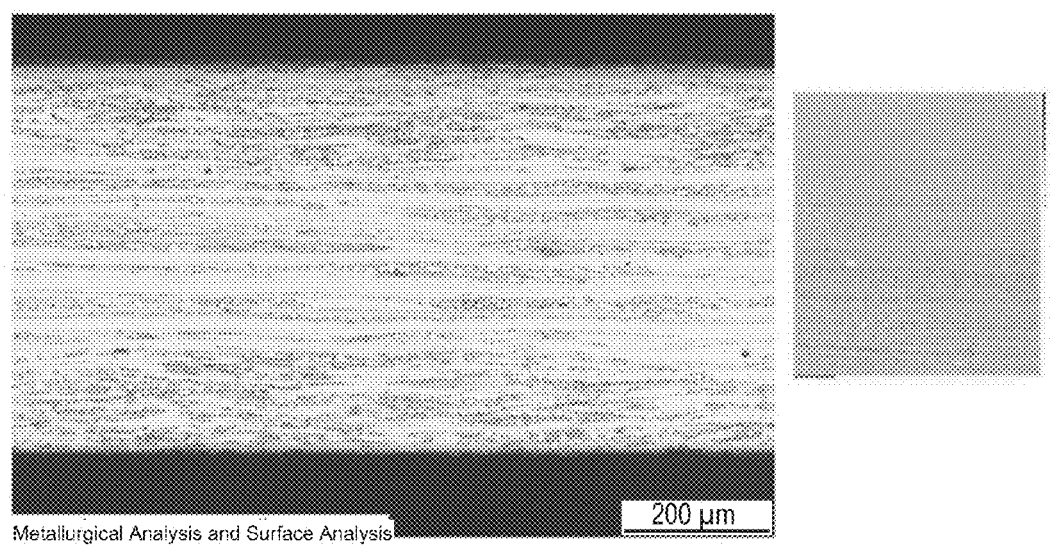
FIG. 2: shows an element distribution analysis by means of a micro-probe over the cross-section of a cold-rolled, finish-annealed specimen in the partially recrystallized state with a low degree of recrystallization.
Figure 3:
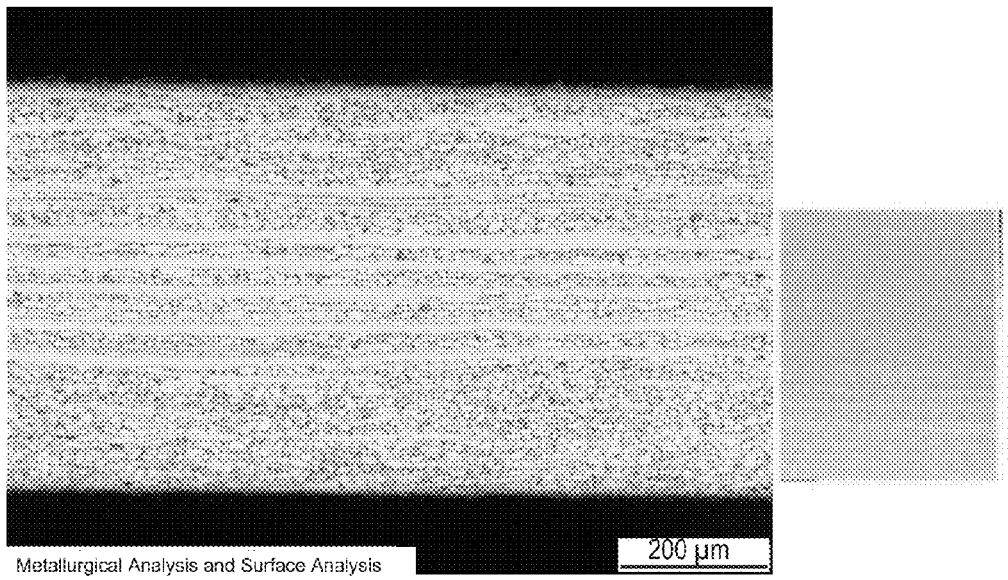
FIG. 3: shows an element distribution analysis by means of a micro-probe over the cross-section of a third specimen, likewise in a cold-rolled, finish-annealed, partially recrystallized state with a high degree of recrystallization.

FIGS. 1 through 3 show element distribution analyses by means of micro-probes over the cross-section both in the hot strip and in the cold-rolled and finish-annealed (partially recrystallized, annealed) state. As indicated by the keys of the micro-probe images, the dark (blue to red) regions are zones in the structure that are richer in silicon and the light (green to yellow) regions are zones that are poorer in silicon. FIG. 2 shows regions with an elevated silicon content in which the structure is relaxed and has not yet recrystallized. The element distribution analysis in FIG. 3 shows a relatively uniform distribution of silicon in the largely recrystallized structure.

Figure 4:
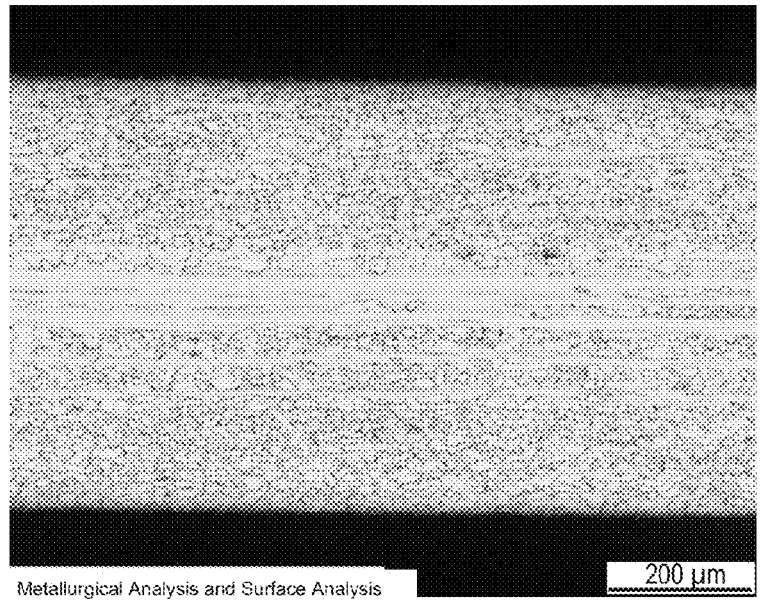
FIG. 4: is a micrograph of a cross-section through the finished material (high percentage of recrystallized structure), cold strip thickness 0.65 mm; degree of recrystallization <90%, slight hardening action through a partially recrystallized structure ReH=571 MPa.
Figure 5:
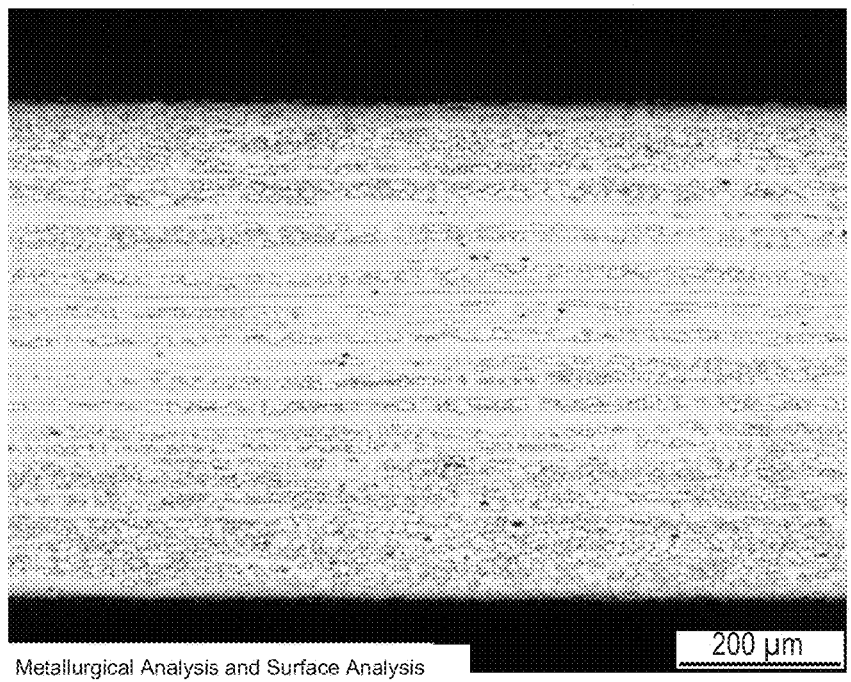
FIG. 5: is a micrograph of a cross-section through the finished material (medium percentage of recrystallized structure), cold strip thickness 0.65 mm; degree of recrystallization <75%, medium hardening action through a partially recrystallized structure.
Figure 6:
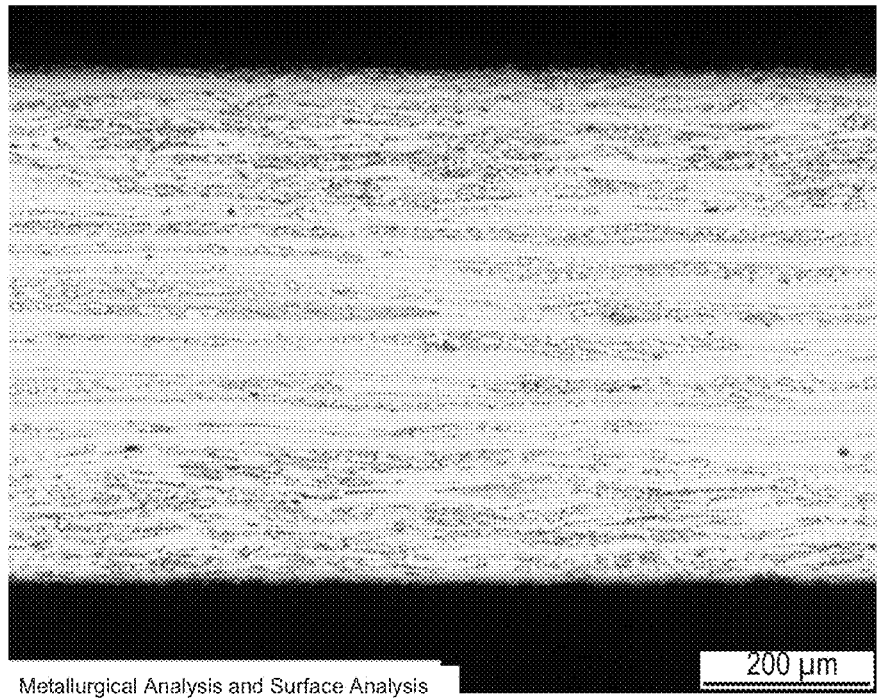
FIG. 6: is a micrograph of a cross-section through the finished material (low percentage of recrystallized structure), cold strip thickness 0.65 mm; degree of recrystallization <20%, powerful hardening action through a partially recrystallized structure.

FIGS. 4 through 6 show the cross-section polish of partially recrystallized finished material in a thickness of 0.65 mm with a similar chemical composition (comparable to the one in example 1) in different stages of recrystallization.

According to the invention, in the finish annealing process of the electrical strip, which influences the degree of recrystallization, it is possible to vary the finish annealing temperature or the annealing duration so that by means of the annealing temperature or annealing duration or both, the appropriate degree of recrystallization in the steel strip is achieved. In this connection, according to the invention, an adjustment is carried out so that the degree of recrystallization is between 5% and 95%, thus enabling a maximum upper apparent yielding point ReH of 450 MPa to 850 MPa, in particular 500 MPa to above 750 MPa.

It has turned out that the process can be carried out in the most stable, reproducible, and reliable fashion in the ranges from 5% to 20% and from 70% to 95% recrystallization. For this reason, the finish annealing temperature of between 600° C. and 800° C., preferably between 650° C. and 720° C. is selected, with an annealing duration of between 60 s and 300 s, in particular between 60 s and 240 s, in particular between 120 s and 220 s.

The electrical strip according to the invention can be used in high-speed machines in which the rotor is exposed to very powerful mechanical stresses while at the same time, no extremely high demands are placed on the magnetic properties in the rotor. As a rule, however, outstanding magnetic properties are required for the stator.

In order to use the respectively optimum material for the two motor components, two types of electrical strip appear to be required.

The invention has the advantage that both the rotor and the stator can be produced from the same base material. This enables an optimal cutting utilization of the strip. Since the high strengths are primarily achieved through recrystallization of certain regions of the structure, the stator parts can, with corresponding annealing treatment after stamping, be fully recrystallized and achieve outstanding magnetic properties. The advantage over a strength increase achieved through precipitation hardening is that the regions that are hardening (relaxed structure), but magnetically poorer can be healed. The annealing treatment required for this corresponds to the annealing that is customarily used in the prior art for semi-finished electrical strip.

By comparison with the annealing of "normal" semi-finished material (which is temper passed and shaped after the finish annealing), a finish annealing of the partially recrystallized material has the advantage of fewer expected changes in the stamped geometries.

For production in the steel mill, first a vacuum treatment is performed to decarburize the material and then the continuous casting is carried out in an intrinsically known way. The slabs produced by the continuous casting are then processed into hot strip; the slab-drawing temperature preferably is between 1,000° C. and 1,200° C., in particular between 1,000° C. and 1,150° C.; the finish rolling temperature is between 800° C. and 950° C., in particular between 830° C. and 910° C.; and the reel temperature is between 500° C. and 800° C., in particular between 650° C. and 750° C. If need be, an optional hot strip annealing can be performed between the hot-rolling and cold-rolling. The resulting hot strip is then cold-processed further to produce cold strip; the deforming strain is between 60% and 85%, in particular between 65% and 85%, and the conventional continuous cold-rolling process with five rolling steps is used. The thickness is then between 0.1 mm and 1.5 mm, in particular from 0.25 mm to 1 mm.

The finish annealing parameters for the correspondingly stamped parts, which should have a high strength due to partial recrystallization, are set so that the annealing temperature is between 600° C. and 800° C., in particular between 650° C. and 720° C.; the annealing duration, which also depends on the annealing temperature, is between 60 s and 300 s, in particular between 60 s and 240 s, in particular between 120 s and 220 s.

The electrical strip is adjusted through chemical analysis so that the following ranges are achieved:
C <0.01 mass %
S 1.5 mass %-3.5 mass %
Al 0.1 mass %-2 mass %
Mn 0.1 mass %-1 mass %
P 0.01 mass %-0.2 mass %
S <0.01 mass %
Ni+Cr+Ti+Nb+V+Cu combined is <1 mass %, preferably <0.3%, preferably only in the form of unalloyed impurities The invention will be explained in conjunction with examples; the abbreviations in the examples are defined as follows:
Reh=upper apparent yielding point
Rm=tensile strength
A80=breaking elongation
P15=core loss at 50 Hz and 1.5 Tesla
J50=polarization at a field strength of 5,000 A/m

Example 1 (FIG. 4)

ReH>550 MPa
Degree of recrystallization <90%

The hot strip is produced as described above and the reel temperature is 720° C. The resulting hot strip is then subjected to a cold deformation in a continuous cold-rolling process, producing a cold strip; the degree of cold deformation is 70%. The cold strip thickness is 0.65 mm.

The resulting strip or the stamped parts produced from this strip is/are then annealed at 680° C. for 150 s. The chemical analysis of the strip in this case is:

C 0.0031 mass %
Si 2.34 mass %
Al 1.03 mass %
Mn 0.27 mass %
P 0.013 mass %
S 0.006 mass %

In this case, it was possible to achieve the following mechanical properties:

| Mechanical: | Reh (transverse): | 571 MPa |
|---|---|---|
| | Rm (transverse): | 623 MPa |
| | A80: | 18.8% |
| Magnetic: | P15: | 6.7 W/kg |
| | J50: | 1.66 T |

Figure 7:
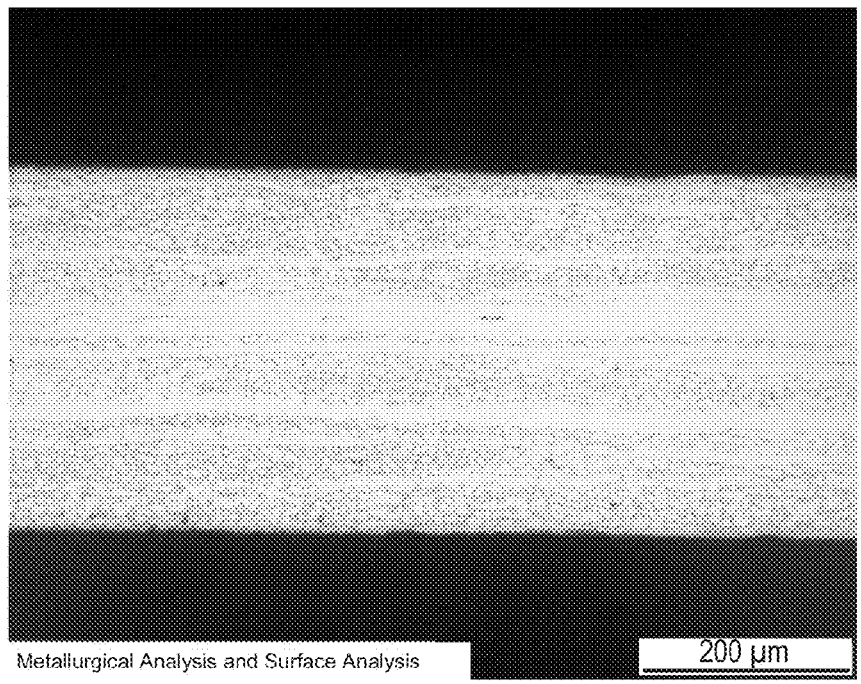
FIG. 7: is a micrograph of a cross-section through the finished material (medium percentage of recrystallized structure), cold strip thickness 0.35 mm; ReH=633 MPa.

Example 2 (FIG. 7)

ReH>600 MPa
Degree of recrystallization <75%

The hot strip was produced as described above and reeled at 660° C.; then the hot strip was continuously rolled into a cold strip in a cold-rolling process; the degree of cold deformation was 83% and the cold strip thickness was 0.35 mm. The stamped parts were annealed at a finish annealing temperature of 670° C. for 150 s.

The chemical analysis of this strip was:
C 0.0039 mass %
Si 3.11 mass %
Al 0.92 mass %
Mn 0.43 mass %
P 0.014 mass %
S 0.007 mass %

With this procedure, it was possible to achieve the following properties:

| Mechanical: | Reh (transverse): | 633 MPa |
|---|---|---|
| | Rm (transverse): | 672 MPa |
| | A80: | 18.97% |
| Magnetic: | P15: | 6.7 W/kg |
| | J50: | 1.64 T |

Figure 8:
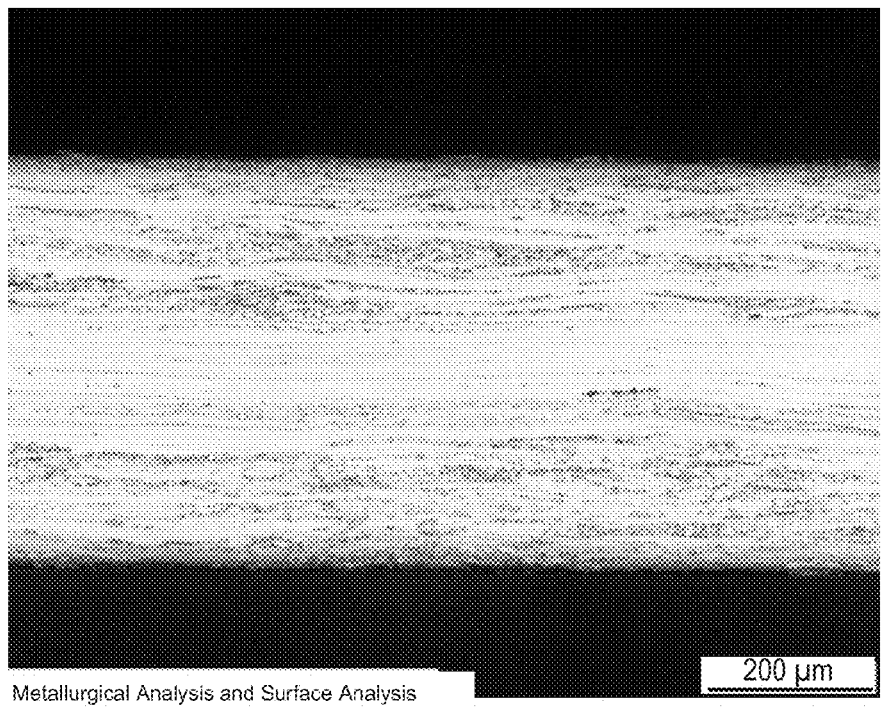
FIG. 8: is a micrograph of a cross-section through the finished material (low percentage of recrystallized structure), cold strip thickness 0.5 mm; ReH=742 MPa.

Example 3 (FIG. 8)

ReH>650 MPa
Degree of recrystallization <20%

The corresponding hot strip was produced as described above and reeled at 660° C. The resulting hot strip was then continuously cold-rolled with a degree of cold deformation of 77% and an achieved cold strip thickness of 0.5 mm. The annealing duration was 150 s at a finish annealing temperature of 650° C.

The chemical analysis of the strip in this case was:
C 0.0027 mass %
Si 2.35 mass %
Al 1.03 mass %
Mn 0.53 mass %
P 0.148 mass %
S 0.004 mass %

With this procedure, it was possible to achieve the following properties:

| Mechanical: | Reh (transverse): | 742 MPa |
|---|---|---|
| | Rm (transverse): | 779 MPa |
| | A80: | 5.3% |
| Magnetic: | P15: | 8.9 W/kg |
| | J50: | 1.59 T |

The individual examples and particularly also the figures show the recrystallization gradient that was achieved by means of the annealing duration, but that can also be achieved with a shortened annealing duration and a higher temperature; these can also be used to adjust the gradient.

As shown in examples 2 and 3, it is also possible—by varying the alloy elements, in particular by elevating strength-increasing elements such as silicon and phosphorus, which act as solid solution hardeners—to achieve an additional hardening of the material with a similar degree of crystallization.

The invention claimed is:

1. A method for producing a higher-strength non-grain-oriented electrical strip, comprising:
    casting a slab from a molten mass having a silicon content >2 mass %, wherein segregations of silicon occur in the slab during casting, resulting in silicon-poorer regions and regions with an elevated silicon content, comparatively;
    hot-rolling the slab;
    optionally hot strip annealing the slab after the hot-rolling and before cold-rolling;
    cold-rolling the slab to produce a partially recrystallized structure so as to set ReH strength values in the range from 450 MPa to 850 MPa;
    annealing the cold strip at an annealing temperature from 600° C. to 800° C. for 60 s to 300 s so that a recrystallization takes place in silicon-poorer regions that are close to a surface of the structure, wherein segregation regions with an elevated silicon content only occur in a relaxed and non-recrystallized state, the cold strip having a silicon content between 2 mass % and 3.5 mass %; and
    making adjustments to segregation regions in the strip through the annealing temperature and duration in order to produce different mechanical properties over a thickness of the strip, with greater recrystallized regions having enhanced magnetic properties and lesser or non-recrystallized regions having higher strengths.

2. The method according to claim 1, comprising using an electrical strip with the following chemical composition:
    C <0.01 mass %
    Si 2 mass %-3.5 mass %
    Al 0.1 mass %-2.0 mass %,
       in particular 0.1 mass % to 1.5 mass %
    Mn 0.1 mass %-1 mass %
    P 0.01 mass %-0.2 mass %
    S <0.01 mass %.

3. The method according to claim 1, wherein the content of Ni+Cr+Ti+Nb+V+Cu combined in the electrical strip is <1 mass %.

4. The method according to claim 1, wherein the degree of recrystallization is between 5% and 95%.

5. The method according to claim 1, further comprising rolling the electrical strip to a thickness of 0.1 mm to 1.5 mm.

6. The method according to claim 1, comprising using the electrical strip for rotor lamination stacks and stator lamination stacks of electric motors or generators or for lamination stacks of transformers.

7. The method of according to claim 1, comprising using the electrical strip for rotor lamination stacks and stator lamination stacks, wherein when the electrical strip is used for rotors, carrying out either no finish annealing or only a slight finish annealing so that the electrical strip is used in a non-recrystallized or only slightly recrystallized state, and when the electrical strip is used for stators, carrying out stamping and subsequent annealing so that the electrical strip is used in a partially or fully recrystallized state.

8. The method according to claim 1, wherein the degree of recrystallization is between 5% and 20%.

9. The method according to claim 1, wherein the degree of recrystallization is between 70% and 95%.

10. The method according to claim 1, wherein the degree of recrystallization ranges from 5% to 20% and from 70% to 95% recrystallization.

* * * * *